Jan. 8, 1924.

G. H. STEVENSON 1,480,227

IMPEDANCE ELEMENT

Filed May 16, 1921

Inventor:
George H. Stevenson,

Patented Jan. 8, 1924.

1,480,227

UNITED STATES PATENT OFFICE.

GEORGE H. STEVENSON, OF RYE, NEW YORK, ASSIGNOR TO WESTERN ELECTRIC COMPANY, INCORPORATED, OF NEW YORK, N. Y., A CORPORATION OF NEW YORK.

IMPEDANCE ELEMENT.

Application filed May 16, 1921. Serial No. 469,826.

*To all whom it may concern:*

Be it known that I, GEORGE H. STEVENSON, a subject of the King of Great Britain, residing at Rye, in the county of Westchester, State of New York, have invented certain new and useful Improvements in Impedance Elements, of which the following is a full, clear, concise, and exact description.

This invention relates in general to electrical impedance elements and more particularly to adjustable impedance elements adapted to be used in systems employing high frequency alternating currents.

It is the object of the invention to provide an impedance element which may be very accurately adjusted and which shall be simple in construction and inexpensive to manufacture.

Devices of this character are particularly useful where an accurate balance between two impedances is required. One such case is a Wheatstone bridge adapted for making measurements with high frequency alternating currents where it is necessary that the ratio arm impedances be very accurately balanced. The resistance of such an element may be very accurately adjusted and will remain constant but the impedance will be variable at different frequencies since it is practically impossible to make the element non-reactive. In the preferred form of this invention a variable condenser is provided which has sufficient range of capacity to obtain an accurate balance of two such elements. A shield is provided to insure that the electrostatic lines of force emanting from the impedance element terminate always on one surrounding surface whose potential relatively to the impedance element is fixed. This gives definiteness and constancy to the effective reactance of the element. The shield so provided forms one plate of the condenser. The other plate of the condenser is a disk within the shield which is adjustable by means of a longitudinally movable shaft supporting the disk as well as the resistance winding.

Figure 1:
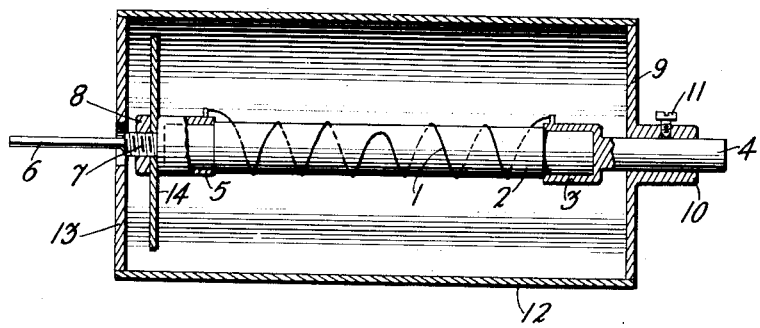
Figure 2:
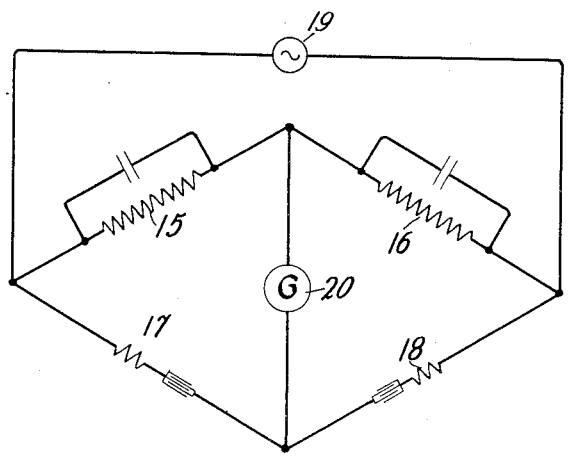

The invention will be more completely understood by referring to the drawing in which Fig. 1 is a sectional view of its preferred form; and Fig. 2 is a diagrammatic representation of a circuit in which the invention may be employed to advantage.

A non-reactive winding 1 is wound upon a shaft 2 which is preferably of insulating material. One end of the shaft 2 fits tightly into the cup-shaped end 3 of a shaft 4 which is made of conductive material since it serves as one terminal for the non-inductive winding 1. The other end of shaft 2 fits into the cup-shaped end 5 of a shaft 6. Shaft 6 with its end 5 is of conductive material and serves as the other terminal for the winding 1. Shaft 6 is provided with a threaded portion 7 and a nut 8 fitting thereon.

The shaft 4 is slidably supported in a plate 9 having a projection 10 integrally formed therewith. The projection 10 is bored to receive the shaft 4. A set-screw 11 holds the shaft rigidly in position. A cylindrical shell 12, of which the plate 9 closes one end, extends coaxially with the shaft 2 to enclose the winding 1. The shell 12 is closed at its other end by a plate 13 which is provided with an aperture allowing the end of shaft 6 to project therethrough. The plate 13, shell 12 and plate 9 are of non-magnetic metallic material and their purpose is to form a shield to permanently define the electrostatic lines of force emanating from the winding 1. Within this shield and fastened on the shaft 6 under the nut 8 and parallel to plate 13, is placed a circular disk 14 of conductive material and somewhat smaller in diameter than the shell 12.

Since one end of the winding 1 is connected with the disk 14, and the other end, with plate 13, there will be a slight capacitance thus formed. This may be varied by loosening the set-screw 11 and sliding longitudinally the entire internal structure carrying the disk 14, thereby adjusting the distance between the condenser elements to produce the desired capacity effect.

Figure 2 shows a Wheatstone bridge adapted for measurements with alternating currents of high frequency. It includes a quadrilateral arrangement of ratio arms 15 and 16, and two arms 17 and 18 containing impedance elements to be balanced and measured. High frequency current is impressed on the bridge from the current source 19, and the state of balance is indicated as usual by a current detector 20. It is evident that at certain frequencies the impedances of the arms 15 and 16 may differ considerably unless the reactance and the resistance in each are exactly equal. This almost never occurs naturally and it is therefore necessary that some means for adjusting the impedances be provided. Such a means is provided by the structure of Figure 1 as above described.

What is claimed is:

1. An electrical impedance element comprising a winding and means to adjust the reactance of said element comprising, an enclosing casing forming an electrostatic shield for said winding and connected to one end of said winding, and an adjustable member within the casing connected to the other end of said winding and forming with said casing a variable condenser.

2. An electrical impedance element comprising a casing of electrically conductive material, a shaft within the casing and supported thereby, a substantially non-inductive winding on the shaft, and a plate member of conductive material supported by the shaft in proximity to the casing to form a condenser therewith.

3. An electrical impedance element comprising a shaft, a non-inductive winding on the shaft, a conductive plate member supported on the shaft and electrically connected with the winding, a closed cylindrical metallic casing coaxial with the shaft and enclosing the winding and the plate, and means to adjust the distance of the plate from the end of the casing.

In witness whereof, I hereunto subscribe my name this 13th day of May A. D., 1921.

GEORGE H. STEVENSON.